US009083828B2

(12) United States Patent
Kawashima

(10) Patent No.: US 9,083,828 B2
(45) Date of Patent: Jul. 14, 2015

(54) COMMUNICATION APPARATUS THAT CARRIES OUT COMMUNICATION WITH EXTERNAL APPARATUS, CONTROL METHOD THEREFOR, AND STORAGE MEDIUM

(75) Inventor: Yasuaki Kawashima, Kawasaki (JP)

(73) Assignee: CANON KABUSHIKI KAISHA (JP)

(*) Notice: Subject to any disclaimer, the term of this patent is extended or adjusted under 35 U.S.C. 154(b) by 80 days.

(21) Appl. No.: 13/464,110

(22) Filed: May 4, 2012

(65) Prior Publication Data

US 2012/0287468 A1 Nov. 15, 2012

(30) Foreign Application Priority Data

May 11, 2011 (JP) ................. 2011-106216

(51) Int. Cl.
G06F 15/00 (2006.01)
H04N 1/00 (2006.01)
H04N 1/32 (2006.01)
H04N 1/23 (2006.01)
H04N 1/327 (2006.01)
H04N 1/333 (2006.01)

(52) U.S. Cl.
CPC ....... H04N 1/00225 (2013.01); H04N 1/00408 (2013.01); H04N 1/00477 (2013.01); H04N 1/2384 (2013.01); H04N 1/2392 (2013.01); H04N 1/32106 (2013.01); H04N 1/32765 (2013.01); H04N 1/33315 (2013.01); H04N 1/33376 (2013.01); H04N 1/33392 (2013.01); H04N 1/00244 (2013.01); H04N 2201/0094 (2013.01); H04N 2201/3205 (2013.01); H04N 2201/3208 (2013.01); H04N 2201/3274 (2013.01); H04N 2201/3278 (2013.01)

(58) Field of Classification Search
None
See application file for complete search history.

(56) References Cited

U.S. PATENT DOCUMENTS

| | | | |
|---|---|---|---|
| 2003/0103235 A1* | 6/2003 | Gomi | 358/1.15 |
| 2008/0304412 A1* | 12/2008 | Schine et al. | 370/235 |
| 2009/0150789 A1* | 6/2009 | Regnier | 715/736 |
| 2011/0075176 A1* | 3/2011 | Nishio | 358/1.13 |
| 2011/0228310 A1* | 9/2011 | Yanagi | 358/1.14 |
| 2011/0310428 A1* | 12/2011 | Ciriza et al. | 358/1.15 |
| 2012/0236351 A1* | 9/2012 | Arima | 358/1.13 |

FOREIGN PATENT DOCUMENTS

JP  2005-159704 A  6/2005

* cited by examiner

Primary Examiner — Helen Q Zong
(74) Attorney, Agent, or Firm — Rossi, Kimms & McDowell LLP

(57) ABSTRACT

A communication apparatus which is capable of ascertaining whether or not it is possible to transmit image data to a transmission destination irrespective of functions it has, and notifying a user of the ascertainment result, thus enhancing convenience. A storage unit stores an address book including a plurality of addresses indicative of transmission destinations of data. A first receiving unit receives a first message from an external device. A determination unit determines whether an address of the external device that has transmitted the received first message is included in the address book. A display unit displays the address of the external device in a first display form which is different from a display form of other addresses in a case where the determination unit determines that the address of the external device is included in the address book and when the address book is displayed.

7 Claims, 9 Drawing Sheets

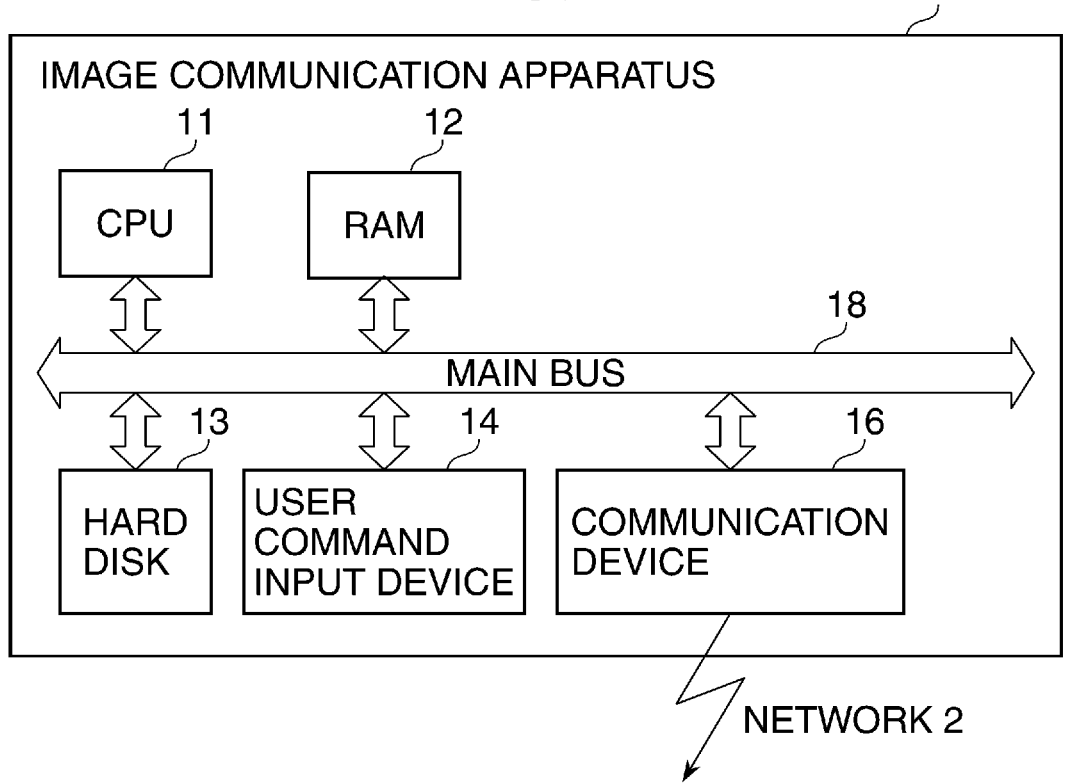

FIG. 8

ADDRESS BOOK DISPLAY SECTION

| HOST NAME | DIRECTORY NAME |
|---|---|
| HostA | Dir1 |
| HostB | Dir2 |
| HostC | Dir3 |
| HostD | Dir4 |

FIG. 9

SUBSCRIBE REQUEST

SCAN FOR OCR TO HOST A. DOMAIN

FIG. 10

ASSOCIATED ADDRESS LIST SECTION STORAGE CONFIRMATION SCREEN

DO YOU CHANGE DISPLAY OF FOLLOWING ADDRESS BY HOST B. DOMAIN SUBSCRIBE REQUEST FROM NOW ON?

| HOST NAME | DIRECTORY NAME |
|---|---|
| HostB | Dir2 |

YES | NO

FIG. 11

EXCLUSION TARGET LIST SECTION

| HOST NAME | DIRECTORY NAME |
|---|---|
| HostB | Dir2 |

FIG. 12

ASSOCIATED ADDRESS LIST SECTION

| HOST NAME | DIRECTORY NAME |
|---|---|
| HostA | Dir1 |
| HostD | Dir4 |

FIG. 13

ASSOCIATED ADDRESS LIST SECTION

| HOST NAME | DIRECTORY NAME |
|---|---|
| HostA | Dir1 |
| HostB | Dir2 |
| HostD | Dir4 |

FIG. 14

UNSUBSCRIBE REQUEST

SCAN FOR OCR TO HOST B. DOMAIN

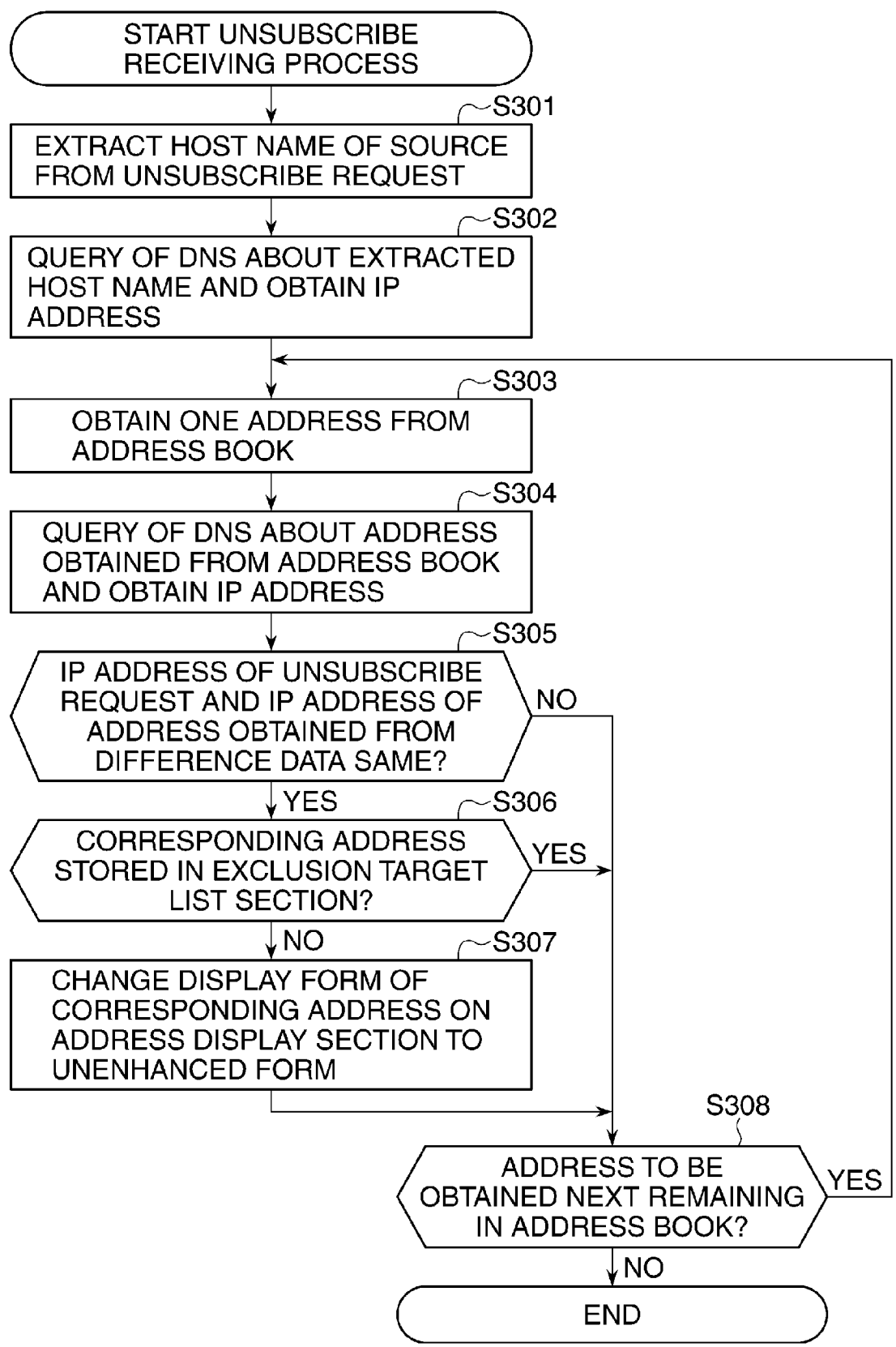

COMMUNICATION APPARATUS THAT CARRIES OUT COMMUNICATION WITH EXTERNAL APPARATUS, CONTROL METHOD THEREFOR, AND STORAGE MEDIUM

BACKGROUND OF THE INVENTION

1. Field of the Invention

The present invention relates to a communication apparatus, a control method therefor, and a computer-readable storage medium storing a control program for implementing the method.

2. Description of the Related Art

In general, image forming apparatuses such as multifunctional peripherals (MFPs) are provided with a communication function of carrying out communication with external apparatuses (such as PCs) via a network or the like. An apparatus that performs the communication function provided in an image forming apparatus will hereafter be referred to as an image communication apparatus (or a communication apparatus).

Conventionally, in an image forming apparatus, a transmission destination is set, and then image read (scan) settings are configured. Then, in accordance with the scan settings, an image is read, and image data is transmitted to the transmission destination by an image communication apparatus.

However, when scan settings are configured without being associated with a transmission destination, image data cannot be successfully transmitted although an image is read. Thus, a user has to associate a transmission destination with the scan settings and read the image again, and this is extremely troublesome.

To cope with this, there has been proposed an image forming apparatus that is provided with a function of obtaining, from a transmission destination, read settings recommended by the transmission destination, and, before reading an image, ascertains whether or not it is possible to transmit image data (see, for example, Japanese Laid-Open Patent Publication (Kokai) No. 2005-159704).

However, the image forming apparatus described in Japanese Laid-Open Patent Publication (Kokai) No. 2005-159704 is based on the premise that when it ascertains whether or not it is possible to transmit image data to the transmission destination, a transmission destination (transmission destination device) has a function of transmitting read settings. Thus, it has the problem that when the transmission destination does not have this function, it cannot be ascertained in an image communication apparatus whether or not it is possible to transmit image data to the transmission destination before an image is read.

SUMMARY OF THE INVENTION

The present invention provides a communication apparatus and a control method therefor which are capable of ascertaining whether or not it is possible to transmit image data to a transmission destination irrespective of functions the transmission destination has, and notifying a user of the ascertainment result, thus enhancing convenience, as well as a computer-readable storage medium storing a control program for implementing the method.

Accordingly, a first aspect of the present invention provides a communication apparatus that transmits data to external, comprising a storage unit configured to store an address book including a plurality of addresses indicative of transmission destinations of data, a first receiving unit configured to receive a first message from an external device, a determination unit configured to determine whether an address of the external device that has transmitted the received first message is included in the address book, and a display unit configured to, in a case where the determination unit determines that the address of the external device is included in the address book and when the address book is displayed, display the address of the external device in a first display form which is different from a display form of other addresses among the plurality of addresses.

Accordingly, a second aspect of the present invention provides a control method for controlling a communication apparatus that transmits data to external, comprising a storage step of storing an address book including a plurality of addresses indicative of transmission destinations of data, a first receiving step of receiving a first message from an external device, a determination step of determining whether an address of the external device that has transmitted the received first message is included in the address book, and a display step of, in a case where it is determined that the address of the external device is included in the address book in the determination step and when the address book is displayed, displaying the address of the external device in a first display form which is different from a display form of other addresses among the plurality of addresses.

Accordingly, a third aspect of the present invention provides a non-transitory computer-readable storage medium storing a program for implementing a control method of controlling a communication apparatus that transmits data to external, the control method comprising a storage step of storing an address book including a plurality of addresses indicative of transmission destinations of data, a first receiving step of receiving a first message from an external device, a determination step of determining whether an address of the external device that has transmitted the received first message is included in the address book, and a display step of, in a case where it is determined that the address of the external device is included in the address book in the determination step and when the address book is displayed, displaying the address of the external device in a first display form which is different from a display form of other addresses among the plurality of addresses.

According to the present invention, it is ascertained whether or not it is possible to transmit image data to a transmission destination irrespective of functions the transmission destination has, and a user is notified of the ascertainment result, so that convenience can be enhanced.

Further features of the present invention will become apparent from the following description of exemplary embodiments (with reference to the attached drawings).

BRIEF DESCRIPTION OF THE DRAWINGS

FIG. 1 is a block diagram showing a hardware arrangement of an image communication apparatus that is an exemplary communication apparatus according to an embodiment of the present invention.

FIG. 2 is a view showing an exemplary address book stored in an HDD shown in FIG. 1.

FIG. 8 is a view showing addresses displayed on an address book display section on a user command input device when the process at startup described with reference to FIG. 7 is terminated.

FIG. 9 is a view showing an exemplary subscribe request received from an electronic apparatus shown in FIG. 5.

FIG. 10 is a view showing an exemplary inquiry screen displayed on the user command input device shown in FIG. 1.

FIG. 11 is a view showing an exemplary address stored in an exclusion target list section stored in the HDD shown in FIG. 1.

FIG. 12 is a view showing exemplary addresses stored in an associated address list section stored in the HDD shown in FIG. 1.

FIG. 13 is a view showing other exemplary addresses stored in the associated address list section stored in the HDD shown in FIG. 1.

FIG. 14 is a view showing an exemplary unsubscribe request received from an electronic apparatus shown in FIG. 5.

FIG. 15 is a flowchart useful in explaining an exemplary unsubscribe receiving process in FIG. 6.

DESCRIPTION OF THE EMBODIMENTS

Figure 3:
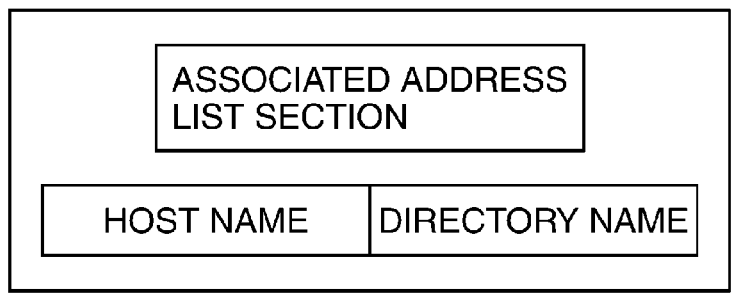
FIG. 3 is a view showing an exemplary associated address list section stored in the HDD shown in FIG. 1.

A description will now be given of an exemplary communication apparatus according to an embodiment of the present invention with reference to the drawings. It should be noted that the communication apparatus is, for example, an image communication apparatus that transmits image data, and this image communication apparatus is provided in an image forming apparatus such as a multifunctional peripheral (MFP).

FIG. 1 is a block diagram showing a hardware arrangement of an image communication apparatus that is an exemplary communication apparatus according to the embodiment of the present invention.

Referring to FIG. 1, the image communication apparatus 1 has a CPU 11, a RAM 12, a hard disk 13, a user command input device 14, and a communication device 16. The CPU 11, RAM 12, hard disk 13, user command input device 14, and communication device 16 are connected together by a main bus 18. The communication device 16 is capable of being connected to an external apparatus (not shown) which is a transmission destination via a network 2 (a wired network or a wireless network).

The CPU 11 is responsible for controlling the image communication apparatus 1. The RAM 12 is used as a work area for the CPU 11. The hard disk (HDD) 13 stores various programs, various settings, and image data (hereafter also referred to as image files). A Floppy® disk or a nonvolatile RAM (NVRAM) may be used in place of the HDD 13.

The user command input device 14 is provided with a display unit, and a user configures various settings via a GUI (graphic user interface). Various types of information held by the image communication apparatus 1 such as information on an address book can be shown on the display unit, and in this case, the display acts as an address book display section. The communication device 16 controls communication with external apparatuses via the network 2.

In the example shown in the figure, the CPU 11 controls the RAM 12, HDD 13, user command input device 14, and communication device 16 via the main bus 18. The CPU 11 controls the communication device 16 and transmits image data to an external apparatus designated as a transmission destination.

FIG. 2 is a view showing an exemplary address book stored in the HDD 13 shown in FIG. 1. FIG. 3 is a view showing an exemplary associated address list section stored in the HDD 13 shown in FIG. 1. Further, FIG. 4 is a view showing an exemplary exclusion target list section stored in the HDD 13 shown in FIG. 1.

Figure 4:
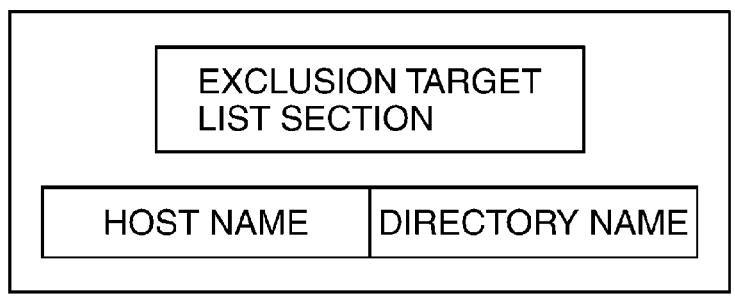
FIG. 4 is a view showing an exemplary exclusion target list section stored in the HDD shown in FIG. 1.

Referring to FIGS. 2 to 4, the address book is provided with host names and directory names. Likewise, the associated address list section and the exclusion target list section, to be described later, are also provided with host names and directory names. The contents of the address book, the associated address list section, and the exclusion target list section are held in the HDD 13. As described earlier, the address book display section is displayed (screen-displayed) on the user command input device 14, and at the time of display on the address book display section, enhanced display, unenhanced display, or standard display is offered. It should be noted that enhanced display, unenhanced display, and standard display are examples of a first display form, a second display form, and a third display form, respectively, in the present embodiment, and standard display is intermediate between the enhanced display and the unenhanced display. Examples of enhanced display include change of display colors, enlargement of characters, boldfacing, hatching, underlining, and display of a predetermined mark alongside. Examples of unenhanced display include change of display colors, reduction of characters, hatching, and display of a predetermined mark alongside, but less conspicuous display as compared to enhanced display is preferable. Standard display is a type of representation different from enhanced display and unenhanced display.

Figure 5:
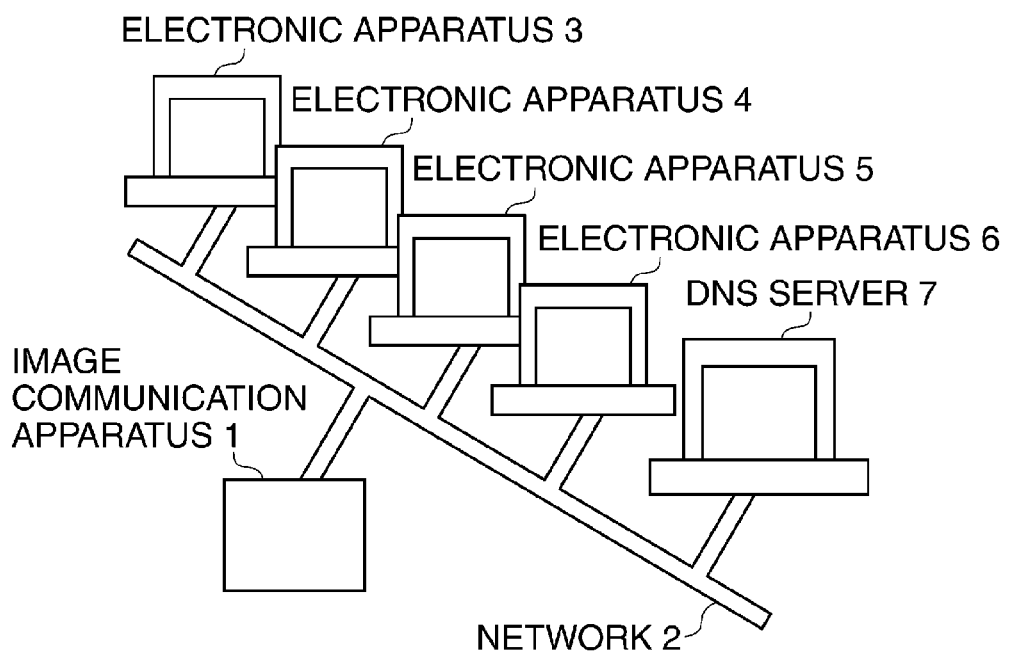
FIG. 5 is a block diagram showing an exemplary network system to which the image communication apparatus shown in FIG. 1 is connected.

FIG. 5 is a block diagram showing an exemplary network system to which the image communication apparatus 1 shown in FIG. 1 is connected.

Referring to FIG. 5, the image communication apparatus 1 is connected to electronic apparatuses (external apparatuses such as a PC) 3 to 6 and a DNS server (domain name server) 7 via the network 2. Each of the electronic apparatuses 3 to 6 sends out a subscribe request (subscribing request) and an unsubscribe request (registration deleting request) defined by WSD protocol (Web Service on Device protocol). The subscribe request and the unsubscribe request are examples of a first message and a second message, respectively, in the present embodiment.

In the example shown in the figure, the electronic apparatus 3 has a host name of Host A appearing in FIG. 2, the electronic apparatus 4 has a host name of Host B in appearing FIG. 2, the electronic apparatus 5 has a host name of Host C in appearing FIG. 2, and the electronic apparatus 6 has a host name of Host D in appearing FIG. 2. Further, regarding addresses registered in the address book, another application can register, delete, and edit the addresses. As shown in FIG. 2, a predetermined number of addresses are registered in the address book.

Figure 6A:
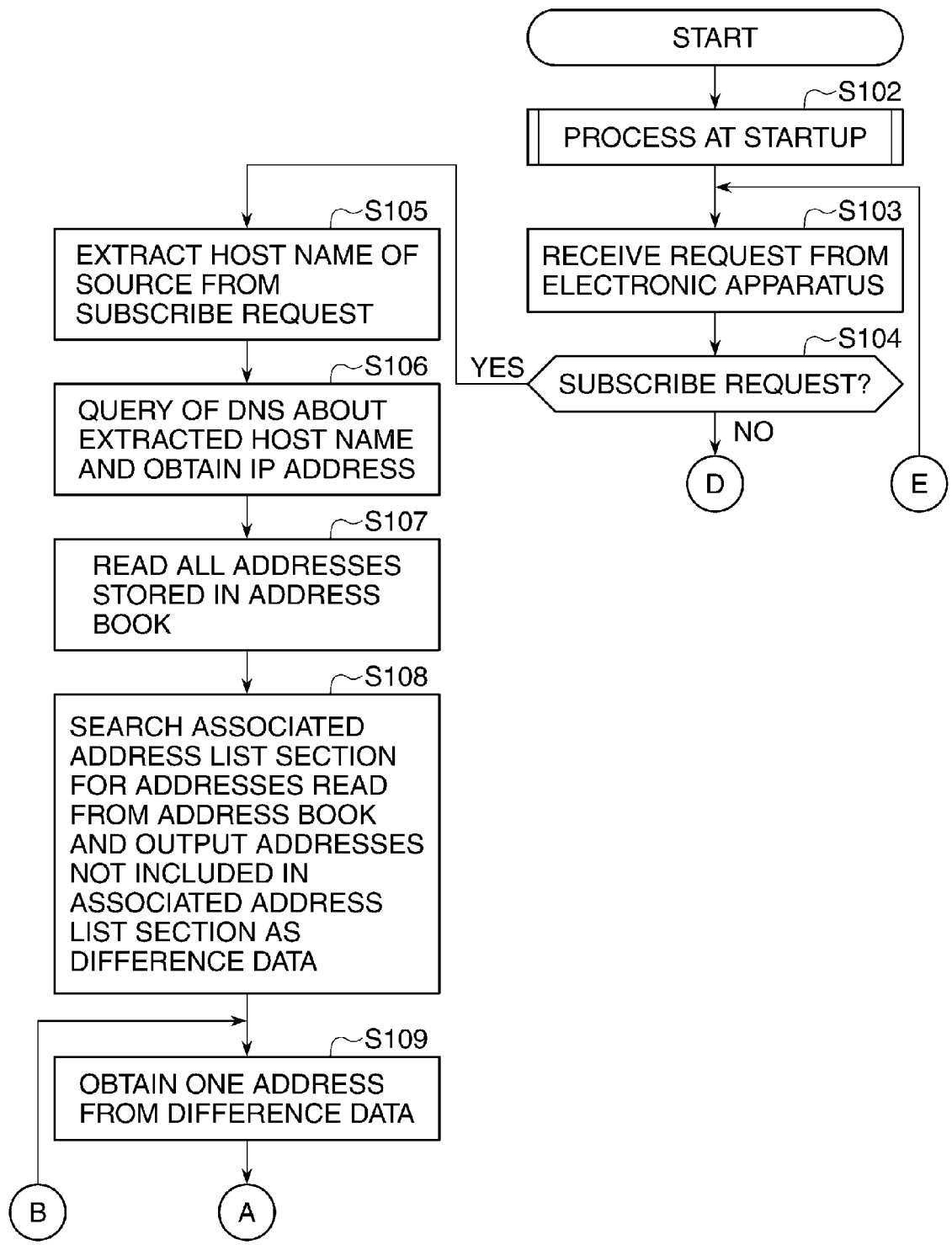
FIGS. 6A to 6C are flowcharts useful in explaining a process carried out by the image communication apparatus shown in FIG. 1.
Figure 6B:
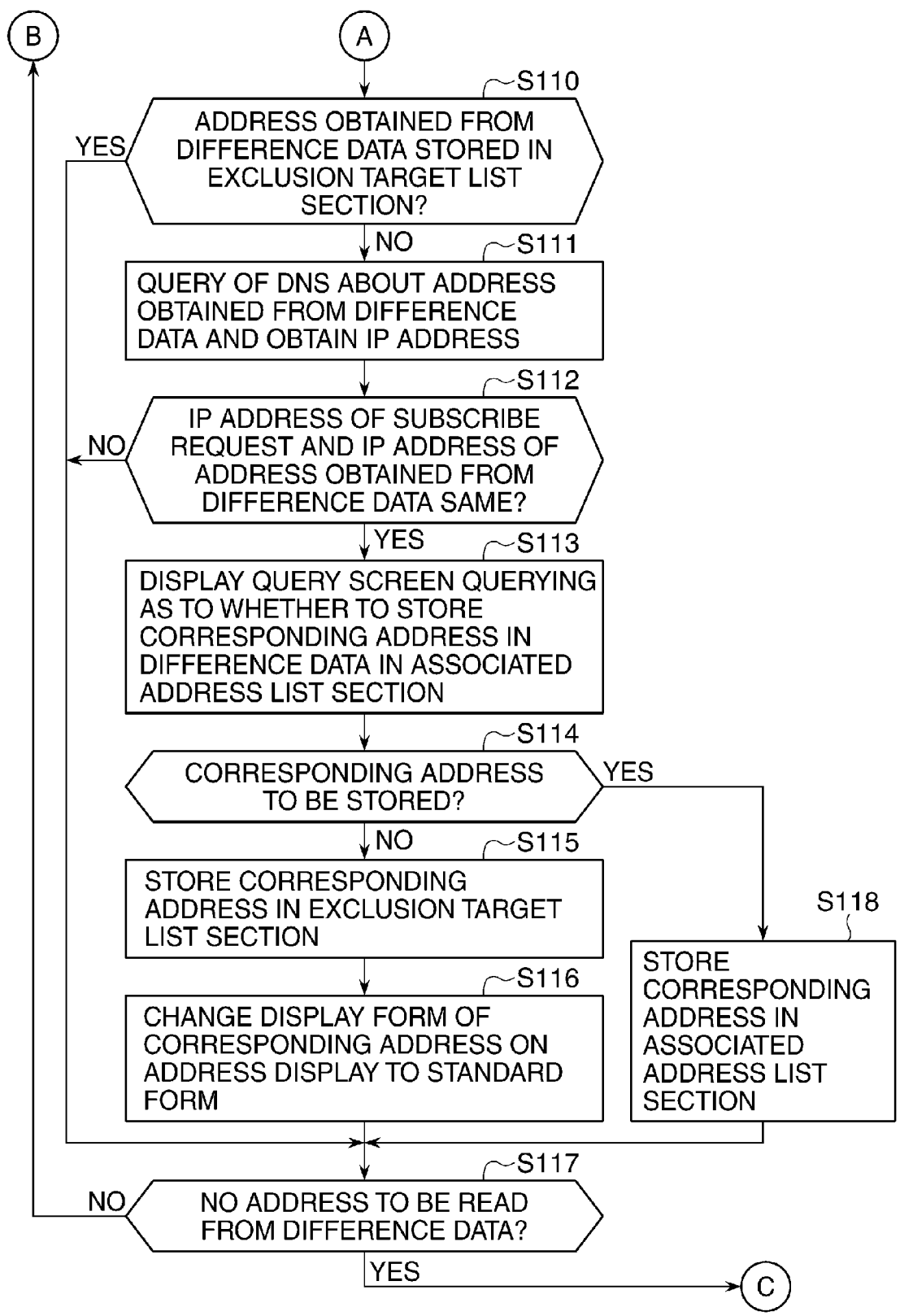
Figure 6C:
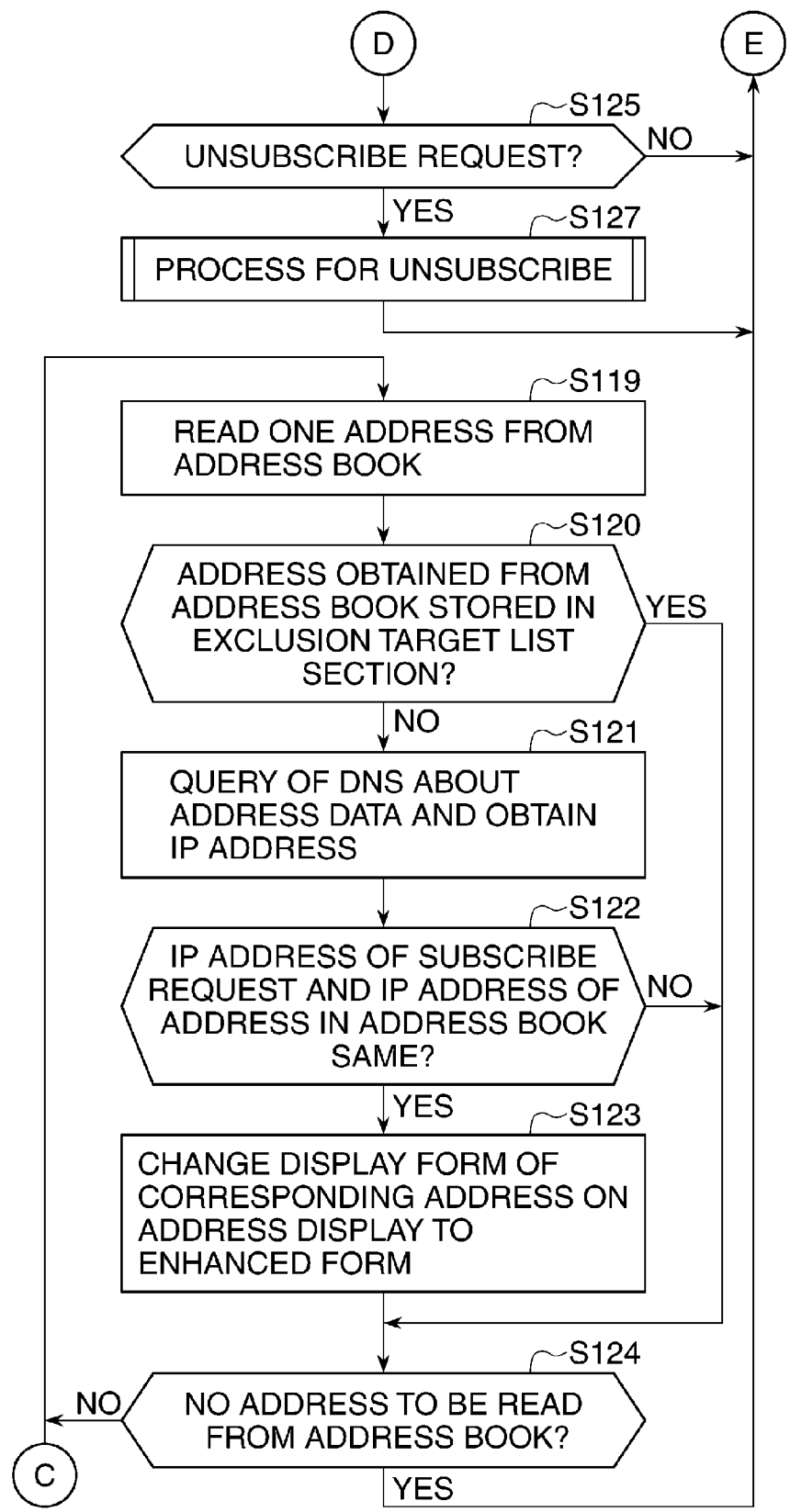

FIGS. 6A to 6C are flowcharts useful in explaining a process carried out by the image communication apparatus 1 shown in FIG. 1.

Referring to FIGS. 1, 5, and 6A to 6C, a program for carrying out the process in FIGS. 6A to 6C is stored in the HDD 13. When power is supplied to the image communication apparatus 1, the CPU 11 expands, on the RAM 12, the program stored in the HDD 13, and carries out the process. First, when the image communication apparatus 1 is activated in response to power being supplied to the image communication apparatus 1, the CPU 11 carries out a process at startup (step S102).

Figure 7:
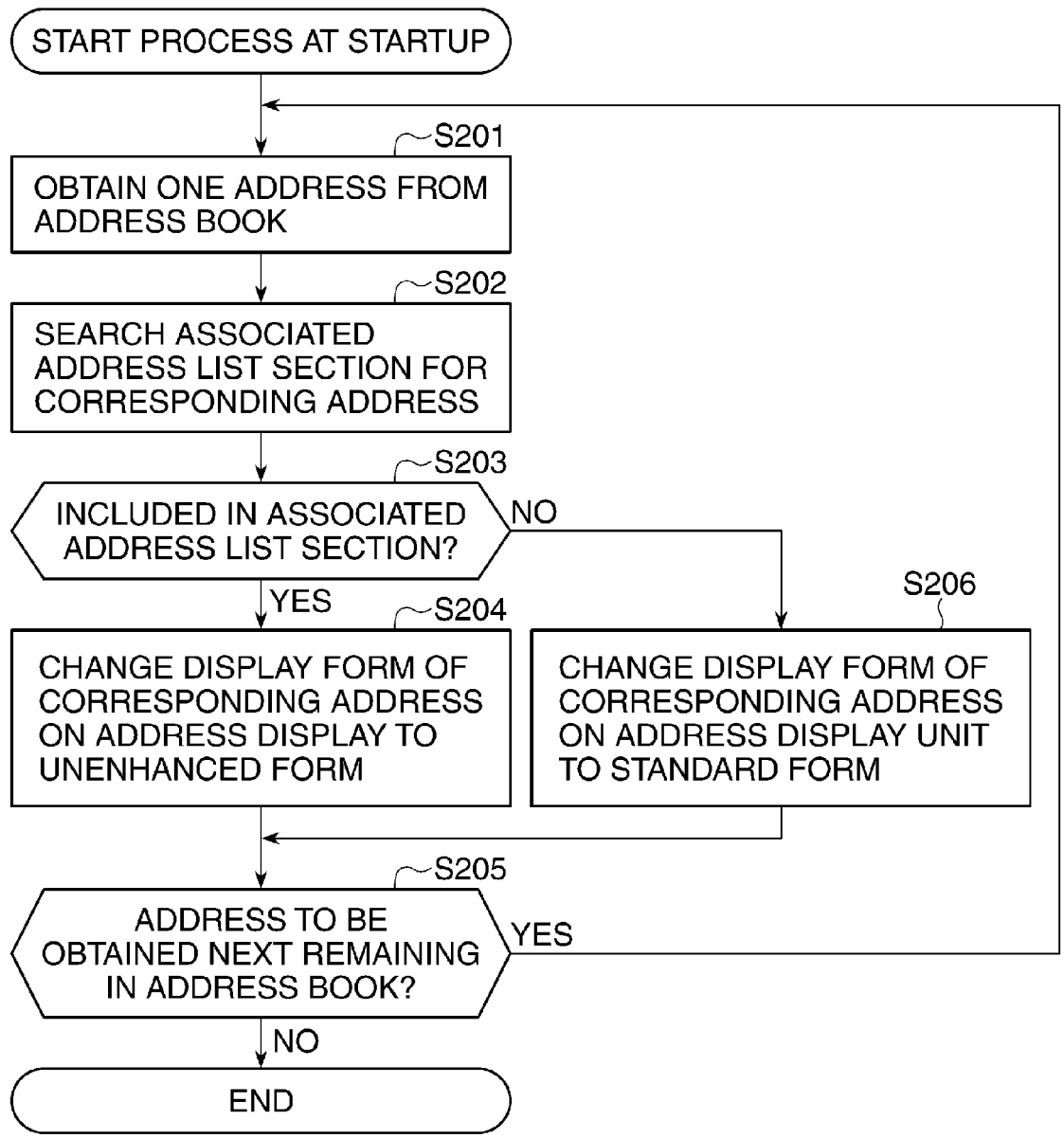
FIG. 7 is a flowchart useful in explaining a process at startup in FIGS. 6A to 6C.

FIG. 7 is a flowchart useful in explaining the process at startup (step S102) in FIG. 6.

Referring to FIGS. 1 and 7, when the process at startup is started, the CPU 11 obtains one address from the address book stored in the HDD 13 (step S201). The CPU 11 searches the associated address list section stored in the HDD 13 for the corresponding address (step S202). Then, the CPU 11 determines whether or not the corresponding address is included in the associated address list section (step S203).

When the corresponding address is included in the associated address list section (YES in the step S203), the CPU 11 displays corresponding address in unenhanced form when displaying this address on the address book display section on the user command input device 14 (step S204).

Then, the CPU 11 ascertains whether or not there is an address to be obtained next in the address book stored in the HDD 13 (step S205). When there is an address to be obtained next (YES in the step S205), the CPU 11 returns to the step S201 and repeatedly carries out the same process until there is no address to be obtained next in the address book. When there is no address to be obtained next (NO in the step S205), the CPU 11 terminates the process at startup and proceeds to step S103, to be described later.

On the other hand, when the corresponding address is not included in the associated address list section (NO in the step S203), the CPU 11 displays the corresponding address in standard form when displaying this address on the address book display section on the user command input device 14 (step S206). The CPU 11 then proceeds to the step S205.

FIG. 8 is a view showing addresses displayed on the address book display section on the user command input device 14 when the process at startup described above with reference to FIG. 7 is terminated.

In the example shown in the figure, Host B and Host C are displayed in unenhanced form, and Host D is displayed in standard form on the address book display section. Host A is displayed in enhanced form.

Referring again to FIGS. 1, 5, and 6, when the process at startup described above with reference to FIG. 7 is terminated, the communication device 16 receives a request message (hereafter referred to merely as "the request") from an electronic apparatus (step S103). Now assume that the request is received from the electronic apparatus 4.

The CPU 11 ascertains whether or not the received request is a subscribe request (step S104). When the received request is a subscribe request, the CPU 11 extracts a host name of a source, which has sent out the subscribe request, included in the subscribe request (step S105).

FIG. 9 is a view showing an exemplary subscribe request received from an electronic apparatus shown in FIG. 5. As shown in FIG. 9, the subscribe request includes a host name and a job instruction.

The CPU 11 inquires the DNS server 7 of the host name of the source extracted from the subscribe request via the communication device 16. Then, the CPU 11 obtains from the DNS server 7 an IP address of the source of the subscribe request (step S106). This IP address will hereafter also be referred to as the first source IP address.

Next, the CPU 11 obtains all addresses from the address book stored in the HDD 13 (step S107). The CPU 11 searches the associated address list section stored in the HDD 13 for all the addresses. The CPU 11 then ascertains whether or not each of all these addresses is included in the associated address list section. The CPU 11 obtains a list of difference data (difference data list) on addresses that are not included in the associated address list section (step S108).

Then, the CPU 11 obtains one (address) from the difference data list (step S109). Then, the CPU 11 ascertains whether or not the obtained address is stored in the exclusion target list section (step S110). When the obtained address is not stored in the exclusion target list section (NO in the step S110), the CPU 11 inquires the DNS server 7 about this address via the communication device 16. Then, the CPU 11 obtains an IP address corresponding to this address from the DNS server 7 (step S111). This IP address will hereafter also be referred to as the difference IP address.

Then, the CPU 11 compares the difference IP address and the IP address (the first source IP address) obtained according to the source of the subscribe request. Then, the CPU 11 ascertains whether or not the difference IP address and the first source IP address match (i.e. whether or not they are the same) (step S112).

When the difference IP address and the first source IP address match (YES in the step S112), the CPU 11 displays, on the user command input device 14, a screen (inquiry screen) that inquires of the user as to whether or not to store the address obtained from the difference data in the associated address list section (step S113).

FIG. 10 is a view showing an exemplary inquiry screen displayed on the user command input device 14 shown in FIG. 1.

Referring to FIG. 10, a name "associated address section storage confirmation screen" is displayed on the inquiry screen, and for example, a message saying "Do you change the display of the following address by Host B. Domain subscribe request from now on?" is displayed. On the inquiry screen, a host name and a directory name are displayed, and also, a "YES" button and a "NO" button are displayed.

When the user depresses the "YES" button, a command to the effect that the address obtained from the difference data is to be stored in the associated address list section is given to the CPU 11. On the other hand, when the user depresses the "NO" button, a command to the effect that the address obtained from the difference data is not to be stored in the associated address list section is given to the CPU 11.

In this way, the user determines whether or not to store the address in the associated address list section, and inputs a command indicative of this using the user command input device 14. In response to the command, the CPU 11 ascertains whether or not to store the address in the associated address list section (step S114).

When the command is a command to the effect that the address is not to be stored in the associated address list section (NO in the step S114), the CPU 11 stores this address in the exclusion target list section stored in the HDD 13 (step S115). Then, the CPU 11 changes the form in which this address is displayed on the address book display section to standard form (step S116). The CPU 11 then ascertains whether or not in the difference data list, there is an address to be obtained next (step S117).

FIG. 11 is a view showing an exemplary address stored in the exclusion target list section stored in the HDD 13 shown in FIG. 1.

Now assume that when no address to be excluded is stored in the exclusion target list section (see FIG. 4), an address whose host name is Host B is stored as a target to be excluded is stored in the exclusion target list section. Namely, when the command is a command to the effect that the address concerned is not to be stored in the associated address list section, an address whose host name is "Host B" and directory name is "Dirt" is stored in the exclusion target list section as shown in FIG. 11.

On the other hand, when the command is a command to the effect that the address concerned is to be stored in the associated address list section (YES in the step S114), that is, when it is determined that the address not present in the associated address list section is to be stored in the associated address list section, the CPU 11 stores this address in the associated address list section stored in the HDD 13 (step S118). Then, the CPU 11 proceeds to the step S117.

It should be noted that when in the step S110, the obtained address is stored in the exclusion target list section (YES in the step S110), the CPU 11 proceeds to the step S117. Likewise, when the difference IP address and the first source IP address do not match (NO in the step S112), the CPU 11 proceeds to the step S117.

FIG. 12 is a view showing exemplary addresses stored in the associated address list section stored in the HDD 13 shown in FIG. 1. FIG. 13 is a view showing other exemplary addresses stored in the associated address list section stored in the HDD 13 shown in FIG. 1.

Now assume that as shown in FIG. 12, an address whose host name is "Host A" and directory name is "Dirt" and an address whose host name is "Host D" and directory name is "Dir4" are stored in the associated address list section. On this occasion, upon receiving a command to the effect that an address whose host name is "Host B" and directory name is "Dir2" is to be stored in the associated address list section, the CPU 11 additionally stores the address whose host name is "Host B" and directory name is "Dir2" in the associated address list section (see FIG. 13).

When in the step S117, there is an address to be obtained next in the difference data list (NO in the step S117), the CPU 11 returns to the step S109 and repeatedly carries out the same process until there is no address to be obtained next in the difference data list.

When in the step S117, there is no address to be obtained next in the difference data list (YES in the step S117), the CPU 11 reads one address from the address book (step S119). Then, the CPU 11 ascertains whether or not the address read from the address book is present in the exclusion target list section (step S120).

When this address is not present in the exclusion target list section (NO in the step S120), the CPU 11 inquires the DNS server 7 about this address via the communication device 16. Then, the CPU 11 obtains an IP address corresponding to the address from the DNS server (step S121). This IP address will hereafter also be referred to as the exclusion target IP address.

Then, the CPU 11 compares the exclusion target IP address and the IP address of the source of the subscribe request (the first source IP address) with each other (step S122). When the exclusion target IP address and the first source IP address match (YES in the step S122), the CPU 11 changes the form in which the address is displayed in the address book display section to enhanced form (step S123). Then, the CPU ascertains whether or not there is an address to be obtained next in the address book (step S124).

When the exclusion target IP address and the first source IP address do not match (NO in the step S122), the CPU 11 proceeds to the step S124.

When there is an address to be obtained next in the address book (NO in the step S124), the CPU 11 returns to the step S119 and repeatedly carries out the same process until there is no address to be obtained next in the address book. On the other hand, when there is no address to be obtained next in the address book (YES in the step S124), the CPU 11 returns to the step S103 and stands by until the communication device 16 receives the next request.

When in the step S104, the received request is not a subscribe request (NO in the step S104), the CPU 11 ascertains whether or not the request is an unsubscribe request (step S125).

FIG. 14 is a view showing an exemplary unsubscribe request received from an electronic apparatus shown in FIG. 5. As shown in FIG. 14, the unsubscribe request includes a host name and a job instruction.

When the received request is not an unsubscribe request (NO in the step S125), the CPU 11 returns to the step S103 and stands by until the communication device 16 receives the next request.

On the other hand, when the request is an unsubscribe request (YES in the step S125), the CPU 11 carries out an unsubscribe receiving process, to be described later (step S127). Then, the CPU 11 returns to the step S103 and stands by until the communication device 16 receives the next request.

FIG. 15 is a flowchart useful in explaining an example of the unsubscribe receiving process in FIG. 6.

Now assume that the communication device 16 has received the unsubscribe request shown in FIG. 14 from the electronic apparatus 4. Upon starting the unsubscribe receiving process, the CPU 11 extracts, from the unsubscribe request, a host name of a source that has sent out the unsubscribe request (step S301). The CPU 11 inquires the DNS server 7 about this host name via the communication device 16. Then, the CPU 11 obtains, from the DNS server 7, an IP address of the source that has sent out the unsubscribe request (step S302). This IP address will hereafter be referred to as the second source IP address.

Then, the CPU 11 obtains one address from the address book on the HDD 13 (step S303). The CPU 11 inquires the DNS server 7 about the address via the communication device 16. Then, the CPU 11 obtains, from the DNS server 7, an IP address corresponding to the address (step S304).

Next, the CPU 11 compares the IP address obtained in the step S304 and the IP address of the source that has sent out the unsubscribe request (the second source IP address) with each other (step S305). When the IP address obtained in the step S304 and the second source IP address match (YES in the step S305), the CPU 11 ascertains whether or not the address obtained from the address book is stored in the exclusion target list section (step S306).

When the address obtained from the address book is not stored in the exclusion target list section (NO in the step S306), the CPU 11 changes the form in which the address is displayed in the address book display section to unenhanced form (step S307). Then, the CPU 11 ascertains whether or not there is an address to be obtained next in the address book (step S308).

When there is no address to be obtained next in the address book (NO in the step S308), the CPU 11 terminates the unsubscribe receiving process and returns to the step S103 in FIG. 6. On the other hand, when there is an address to be obtained next in the address book (YES in the step S308), the CPU 11 returns to the step S303 and repeatedly carries out the same process until there is no address to be obtained next in the address book.

When in the step S305, the IP address obtained in the step S304 and the second source IP address do not match (NO in the step S305), the CPU 11 proceeds to the step S308. Likewise, when in the step S306, the address obtained from the address book is stored in the exclusion target list section (YES in the step S306), the CPU 11 proceeds to the step S308.

As described above, according to the embodiment of the present invention, there are the address book, associated address list section, and exclusion target list section, and in accordance with a subscribe request or an unsubscribe request transmitted from an electronic apparatus (external apparatus) which is a transmission destination, the form in which an address is displayed on the address book display is changed. Thus, irrespective of functions which a transmission destination has, it is ascertained whether or not it is possible to transmit data to the transmission destination, and the user is notified of the ascertainment result, so that the effect of enhancing convenience can be obtained.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-106216 filed May 11, 2011, which is hereby incorporated by reference herein in its entirety.

What is claimed is:

1. A communication apparatus communicable with an external device using Web Service on Device (WSD) protocol, the communication apparatus comprising:
   a transmitting unit configured to transmit data to the external device;
   a first storing unit configured to store a first address list including plural addresses of designating destinations of the data transmitted by the transmitting unit;
   a display unit configured to display the plural addresses included in the first address list;
   a second storing unit configured to store a second address list of addresses included in the plural addresses of the first address list, display form of each of the addresses of the second address list being changed when the display unit displays the addresses;
   a first receiving unit configured to receive a subscribe request defined by the WSD protocol from the external device;
   a first determination unit configured to determine whether or not an address of the external device that transmitted the subscribe request received by the first receiving unit is included in the second address list; and
   a display control unit configured to:
   change display form of the address of the external device displayed by the display unit into a first display form in accordance with receipt of the subscribe request from the external device, if the first determination unit determines that the address of the external device is included in the second address list; and
   not change the display form of the address of the external device displayed by the display unit in accordance with receipt of the subscribe request from the external device, if the first determination unit determines that the address of the external device is not included in the second address list.

2. The communication apparatus according to claim 1, further comprising:
   a second receiving unit configured to receive an unsubscribe request defined by the WSD protocol from the external device; and
   a second determination unit configured to determine whether or not the address of the external device that transmitted the unsubscribe request received by the second receiving unit is included in the second address list, wherein the display control unit is further configured to:
   change the display form of the address of the external device displayed by the display unit into a second display form in accordance with receipt of the unsubscribe request from the external device, if the second determination unit determines that the address of the external device is included in the second address list; and
   not change the display form of the address of the external device displayed by the display unit in accordance with receipt of the unsubscribe request from the external device, if the second determination unit determines that the address of the external device is not included in the second address list.

3. The communication apparatus according to claim 1, further comprising:
   a third storing unit configured to store a third address list of addresses included in the plural addresses of the first address list and display form of each of which is not changed when the display unit displays the addresses; and
   an inquiring unit configured to inquire a user about whether the address of the external device that transmitted the subscribe request is to be added in the second address list or the third address list when the address of the external device that transmitted the subscribe request received by the first receiving unit is not included in the second and third address lists.

4. The communication apparatus according to claim 1, wherein the first display form is enhanced display.

5. The communication apparatus according to claim 1, wherein the second display form is unenhanced display.

6. A method of controlling a communication apparatus communicable with an external device using a Web Service on Device (WSD) protocol, the method comprising the steps of:
   a transmitting step of transmitting data to the external device;
   a first storing step of storing a first address list including plural addresses of designating destinations of the data transmitted in the transmitting step;
   a display step of displaying the plural addresses included in the first address list; a second storing step of storing a second address list of addresses included in the plural addresses of the first address list, display form of each of the addresses of the second address list being changed when the display step displays the addresses;
   a first receiving step of receiving a subscribe request defined by the WSD protocol from the external device;
   a first determination step of determining whether or not an address of the external device that transmitted the subscribe request received in the first receiving step is included in the second address list; and display control steps of:

changing display form of the address of the external device displayed in the display step into a first display form in accordance with receipt of the subscribe request from the external device, if the first determination step determines that the address of the external device is included in the second address list; and not changing the display form of the address of the external device displayed in the display step in accordance with receipt of the subscribe request from the external device, if the first determination step determines that the address of the external device is not included in the second address list.

7. A non-transitory computer-readable storage medium storing a program for implementing a method of controlling a communication apparatus communicable with an external devices using a Web Service on Device (WSD) protocol, the method comprising the steps of:

a transmitting step of transmitting data to the external device;

a first storing step of storing a first address list including plural addresses of designating destinations of the data transmitted in the transmitting step;

a display step of displaying the plural addresses included in the first address list; a second storing step of storing a second address list of addresses included in the plural addresses of the first address list, display form of each of the addresses of the second address list being changed when the display step displays the addresses;

a first receiving step of receiving a subscribe request defined by the WSD protocol from the external device;

a first determination step of determining whether or not an address of the external device that transmitted the subscribe request received in the first receiving step is included in the second address list; and display control steps of:

changing display form of the address of the external device displayed in the display step into a first display form in accordance with receipt of the subscribe request from the external device, if the first determination step determines that the address of the external device is included in the second address list; and not changing the display form of the address of the external device displayed in the display step in accordance with receipt of the subscribe request from the external device, if the first determination step determines that the address of the external device is not included in the second address list.

* * * * *